Dec. 24, 1929.   H. A. AFFEL   1,740,491
COMPENSATION FOR PHASE VARIATIONS
Filed Sept. 23, 1927   2 Sheets-Sheet 1
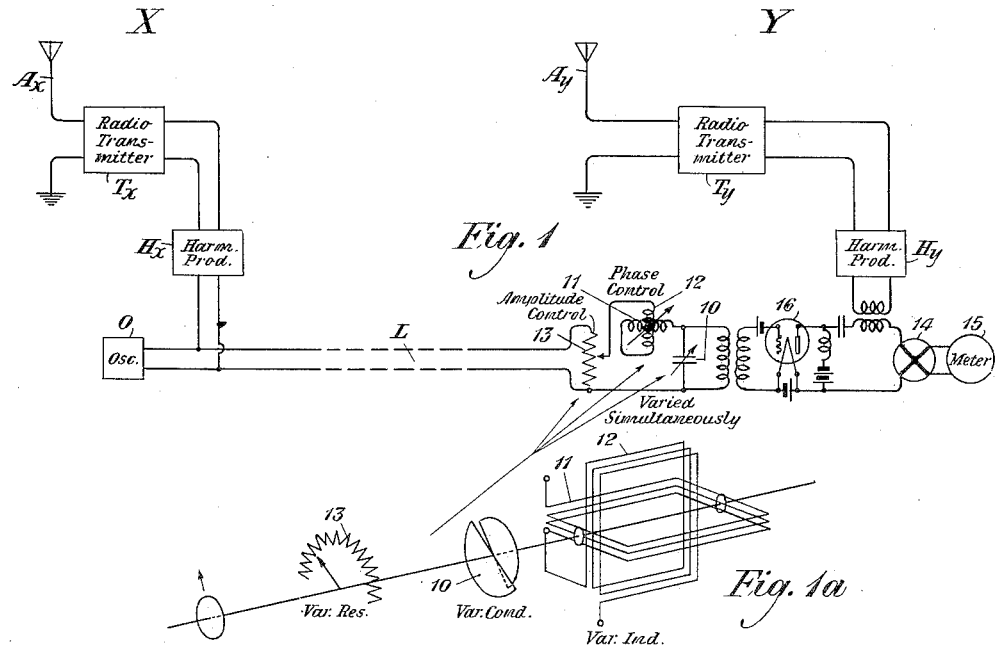
Fig. 1
Fig. 1a
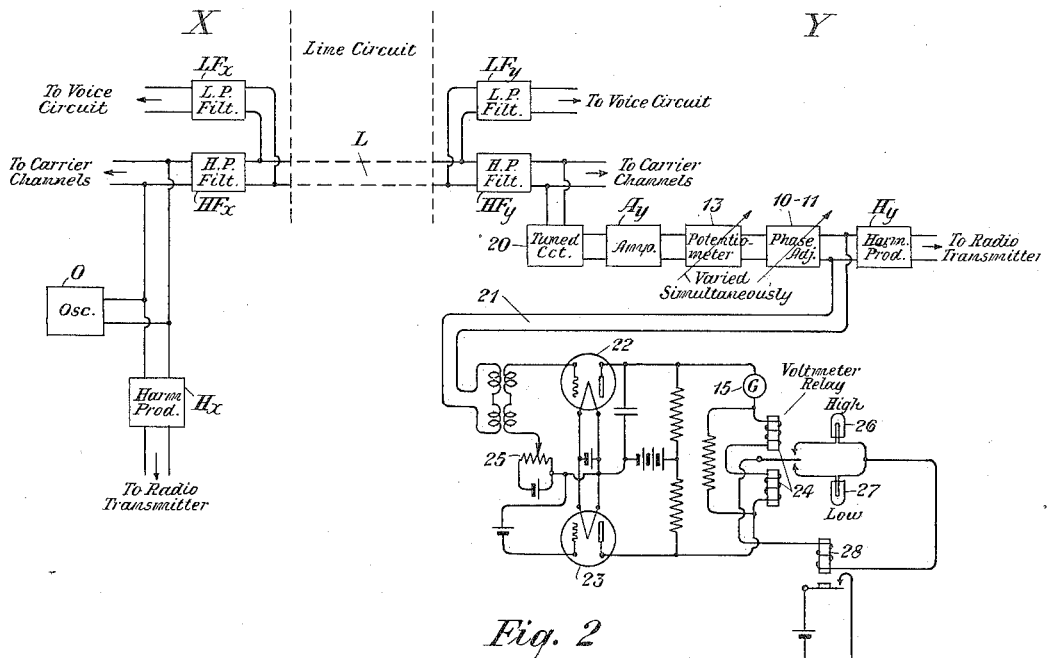
Fig. 2
INVENTOR.
H. A. Affel
BY
ATTORNEY Dec. 24, 1929.                    H. A. AFFEL                    1,740,491
                       COMPENSATION FOR PHASE VARIATIONS
                    Filed Sept. 23, 1927        2 Sheets-Sheet 2
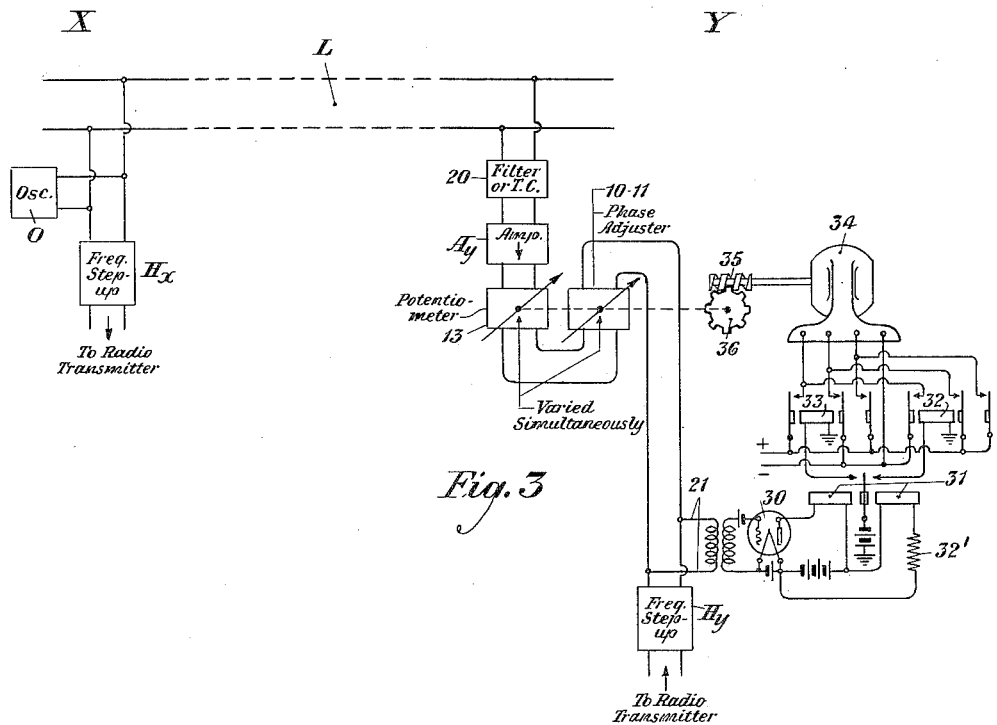
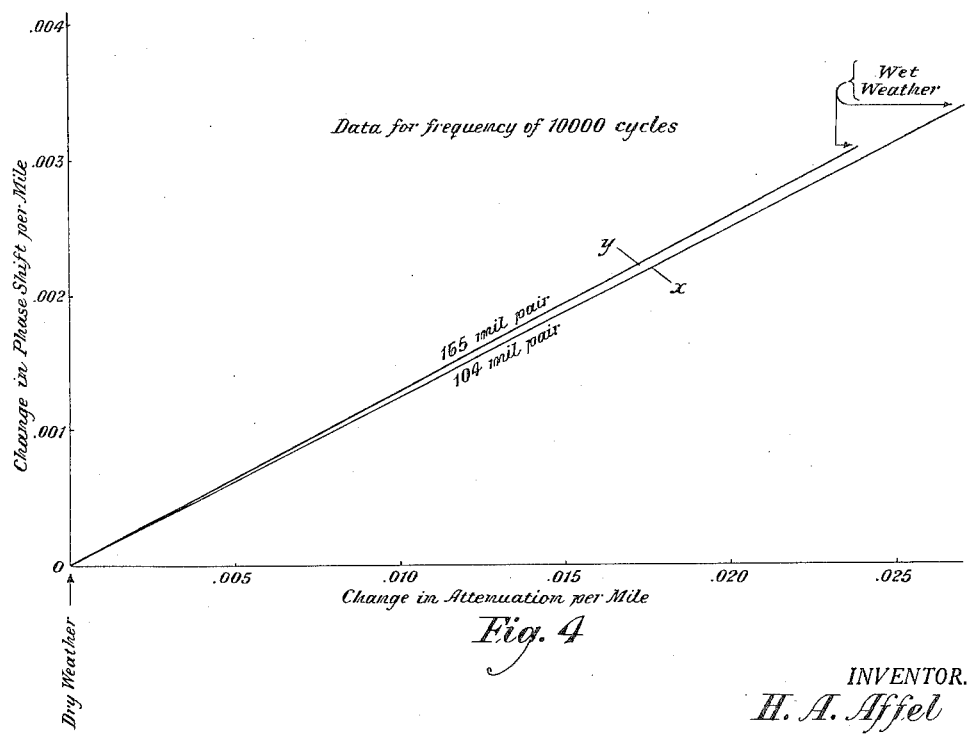
INVENTOR.
H. A. Affel
BY
ATTORNEY Patented Dec. 24, 1929

1,740,491

UNITED STATES PATENT OFFICE

HERMAN A. AFFEL, OF RIDGEWOOD, NEW JERSEY, ASSIGNOR TO AMERICAN TELEPHONE AND TELEGRAPH COMPANY, A CORPORATION OF NEW YORK

COMPENSATION FOR PHASE VARIATIONS

Application filed September 23, 1927. Serial No. 221,564.

This invention relates to arrangements and methods by which phase variations on line circuits, and more particularly on open wire lines, may be counteracted or equalized.

While it may be important to counteract or equalize phase variations on line circuits under various circumstances, it is more particularly important where the line circuits are employed for transmitting a pilot or control frequency for a chain broadcasting system. It has been proposed, for example, that broadcasting be accomplished from a number of stations employing a common frequency, and that the different stations be kept in synchronism by means of a control frequency transmitted over wires. With such an arrangement, relatively small variations in the phase of the low frequency currents transmitted over the line would, by virtue of the frequency multiplication employed at each broadcasting station, be greatly magnified in stepping-up the control frequency to a radio frequency. For a listener so located as to receive approximately equal field strength from two broadcasting stations operating on the same wave length, the variations in the phase of the radio frequency currents at the two stations would produce slow fading effects or other interference. For a common frequency broadcasting system, therefore, it is highly desirable to eliminate variations in the phase of the control frequency transmitted over the wire circuits.

In accordance with the present invention, it is proposed to accomplish this result by making phase adjustments in some adjustable element of the circuit at the broadcasting station to compensate for any changes in phase of the control frequency as its arrives at the station. As it is impractical to make direct observations of the changes in phase which occur, it is desirable to make compensating adjustments in accordance with some other characteristic of the control frequency which varies with the phase. In cable circuits the principal change is a change of resistance corresponding to variations in the temperature to which the cable is subjected. Therefore, the change in phase of the arriving current will bear a definite relation to the change in the resistance of the circuit. It has been heretofore proposed to compensate for changes in phase of the arriving currents in a cable circuit by making phase adjustments in accordance with the noted change in the resistance of the circuit. In open wire lines, however, resistance changes are not important from the standpoint of phase changes. In fact, the effect of change in resistance is, except at very low frequencies, practically negligible so far as production of phase changes in the arriving current is concerned. In open wire circuits, the most effective factor, from the standpoint of causing change in phase, is the variation in the capacity of the insulators as the weather conditions vary from wet to dry. This change in phase shift is accompanied by a change of attenuation resulting from changes of the insulator capacity.

In general, a definite relation exists in open wire circuits between the change in attenuation which occurs with varying weather conditions, and the change in phase shift of the currents transmitted over the line. In accordance with this invention, it is proposed to take advantage of this fact by making compensating phase adjustments in accordance with noted changes in the attenuation of the currents incoming from the open wire line at the broadcasting station. These compensating adjustments may be made either manually or automatically.

The invention may now be more fully understood from the following detailed description, when read in connection with the accompanying drawings, in which Figure 1 shows in schematic form a circuit arrangement for carrying out the invention; Fig. 1ª shows in somewhat more detail the nature of the phase controlling arrangements employed; Figs. 2 and 3 show modified forms of circuit arrangements for carrying out the principles of the invention; and Fig. 4 is a chart containing curves depicting a typical relation which may exist between attenuation and phase shift.

As has already been stated, the invention makes use of the principle that the change in phase of the arriving current will bear some definite relation to the change in the attenuation of the open wire circuit. Inasmuch, however, as the change in the attenuation is due largely to the conditions of insulation of the circuit, it is evident that the relation between phase shift and change in attenuation in a given case will depend upon the design of the insulator structure employed.

In Fig. 4, the curve $x$ depicts graphically the relation between the change in attenuation and the phase shift in the case of a 104 mil pair for a line construction employing insulators of a type commonly employed for telephone purposes. Curve $y$ similarly depicts the relation in the case of a 165 mil pair under similar insulating conditions. These curves, being straight lines, disclose the interesting fact that for the particular type of insulator here involved; a direct proportionality exists between the change in attenuation and the change in phase shift. This simple relation permits of a correspondingly simple mechanical connection between the potentiometer and phase controller which are employed in the apparatus hereinafter described. However, it must be borne in mind that for other types of insulator construction this direct linear relation may not exist, and the relation between attenuation and phase shift may be a constantly varying one. Even though the relation be variable, however, it is still possible to design a potentiometer or amplitude controller and a phase controlling device which may be so related as to bring about the desired phase compensation by a simple manual adjustment.

Referring now to Fig. 1, which illustrates a circuit diagram embodying the above principles, X and Y designate generally two radio broadcasting stations which are intended to broadcast at the same wave length. The apparatus at station X comprises an oscillator O for generating a base or controlling frequency which may be, for example, 5,000 cycles, a harmonic producer $H_x$ indicated conventionally, a radio transmitter $T_x$ also indicated conventionally, and a transmitting antenna $A_x$. The frequency generated by the oscillator is applied to the harmonic producer $H_x$ to produce the desired harmonic which is intended to be used as the carrier wave for the radio transmitter. The harmonic producer may be of any known type such, for example, as a distorting vacuum tube, together with a suitable tuned circuit or other selective device for selecting the desired harmonic. The radio transmitter $T_x$ may likewise be of any known type, such as is now commonly employed for broadcasting.

The frequency generated by the oscillator O is transmitted over the wire line L to the station Y, at which point it may be applied to the harmonic generator $H_y$, similar in all respects to the harmonic generator $H_x$. The desired harmonic which is to be used for radio transmission is then transmitted to the radio transmitter $T_y$, this transmitter being similar to that shown at station X. The transmitter in turn is connected to the transmitting antenna $A_y$. By deriving the radio wave at the stations from the same fundamental, the two stations will broadcast at the same wave length. If, however, the phase relation of the frequencies employed by the two stations changes from time to time, as it will due to the varying conditions of the line L, a listener at a position intermediate between the two stations will encounter interference which will be manifested as a waxing and waning of the signal. It is therefore necessary to maintain the phase relations constant in order to avoid such interference.

This may be accomplished by providing a phase control means which, as illustrated, comprises a variable condenser 10 shunted across the line and a variable inductance comprising coils 11 and 12 in series with the line. The coils 11 and 12 are mounted as shown in Fig. 1ª so as to be rotatable with respect to each other, thereby varying the mutual inductance. By adjusting the coil and the condenser, the phase of the arriving wave may be controlled without changing the attenuation of the circuit.

In order that this adjustment may be made in such a manner as to compensate for any change in phase which has occurred, an amplitude controller, comprising an adjustable potentiometer 13 is associated with the line L, as indicated, and a rectifying thermocouple 14, together with a meter 15, is connected in the output of an amplifier 16 through which the control frequency is supplied to the harmonic producer $H_y$. The thermocouple 14 enables the meter 15 to record the amplitude of the control frequency incoming from the line L and thereby becomes a measure of the attenuation. Normally, the potentiometer 13 is set for a particular amplitude. If the meter 15 shows that the amplitude has increased or decreased, the potentiometer 13 may then be adjusted accordingly to bring the amplitude back to normal. Knowing the relation between attenuation and phase, the phase adjuster may then be changed in accordance with the change in amplitude indicated by the change in the setting of the potentiometer so as to compensate for the change in phase which must have inevitably accompanied the change in attenuation.

In order to simplify these adjustments, the coil 11 of the variable inductance, one plate or set of plates of the variable condenser 10 and the movable contact of the potentiometer 13 may be mounted upon a common shaft, as indicated in Fig. 1ª. The potentiometer is then designed with respect to the inductance and condenser so that a change in the setting of the potentiometer, which will counteract a given change in the attenuation of the line L, will correspond to such an adjustment of the phase controlling element as will just compensate for the change in phase which accompanies the change in attenuation. With this arrangement, whenever the meter 15 shows a departure from the normal current value, the attendant merely adjusts the potentiometer 13 to bring the meter reading back to normal. In making this adjustment the phase controller is automatically so adjusted as to restore the phase relation between the stations X and Y.

It will be understood, of course, that the control frequency may, if desired, be obtained from one of the channels of a carrier telegraph system, or it may comprise the so-called pilot frequency which is frequently used with a carrier system to automatically adjust the attenuation. Or it may be obtained from a special source and transmitted over the transmission line by "sandwiching" the controlling frequency in between the channels of a carrier system superposed upon the line. The latter arrangement is illustrated in Fig. 2. Here the ordinary carrier channels, which may be employed for telephone and telegraph purposes, are superposed upon the line by transmitting them through the filters $HF_x$ and $HF_y$, the ordinary voice currents being transmitted over the line through the filters $LF_x$ and $LF_y$. The oscillator O, which supplies the control frequency, is transmitted to the harmonic producer $H_x$, as in Fig. 1, but is transmitted to the line L through the filter $HF_x$ for transmission to station Y.

At the latter station this frequency, after passing through the filter $HF_y$, is selected from the various carrier channels by means of a tuned circuit 20, and after being suitably amplified by an amplifier $A_x$ is transmitted through the potentiometer 13 and the phase adjuster 10—11 to the harmonic producer $X_y$. The potentiometer and phase adjuster may be of the same type as illustrated in Figs. 1 and 1ª, and may be connected together to be adjusted simultaneously in the manner already described. In order to indicate any change from the normal phase adjustment, a bridge connection 21 leads from the output side of the phase adjuster to the input of a vacuum tube 22. A second vacuum tube 23 is also provided, and a galvanometer 15 and voltmeter relay 24 are connected in series between the plates of the tubes 22 and 23. The tubes 22 and 23 act as rectifiers and the potential applied to the tube 22 is adjustable by means of a potentiometer 25. The potentiometer 25 is adjusted so that when the amplitude (and, of course, the phase) of the current arriving from the line L is normal, no current will flow through the galvanometer 15 and the voltmeter relay 24. If the amplitude of the current should increase, current will flow through the galvanometer and voltmeter relay in such a direction as to shift the armature of the voltmeter relay to close the circuit through the indicator lamp 26. If, on the other hand, the attenuation of the circuit should increase so that the amplitude drops below normal, the rectified current will flow through the voltmeter relay in the opposite direction, causing the armature to close the circuit through the other indicating lamp 27. When the circuit of either lamp is closed, the relay 28 will be operated to close the circuit of an alarm 29. This arrangement not only indicates an abnormal attenuation (and phase) condition, but it also indicates in which direction the condition has departed from normal. Therefore, the attendant knows which way he should adjust the potentiometer 13 to bring the amplitude back to normal. Such adjustment, of course, automatically restores the phase to normal by adjusting the phase controller 10—11, as already described in connection with Fig. 1.

If desired, the adjustment of the potentiometer and phase controller may be accomplished automatically, as illustrated in Fig. 3. In this figure the apparatus at stations X and Y is in general similar to that illustrated in Fig. 2, except that a part of the current transmitted to the frequency step-up device $H_y$ is transmitted through a bridge connection 21 to the input of a vacuum tube rectifier 30. A polar relay 31 has one winding connected with the plate circuit of the tube 30 and the other winding is connected in circuit with a direct current source which may, for example, be the B battery of the tube 30. The current through the right-hand winding of the relay 31 is controlled by means of a resistance 32' so that that with a normal current value incoming from the line L, the recified current through the left-hand winding of the polar relay will be just equal and opposite to the current from the right-hand winding. The armature of the polar relay will therefore be in a neutral position.

If the amplitude of the received current falls below normal, the armature of the polar relay will be shifted to its right-hand contact, thereby closing the circuit of the relay 32 which connects the power supply to a motor 34 in such a manner as to drive the motor in one direction. If, one the other hand, the amplitude of the arriving current increases, the armature of the polar relay 31 shifts to its left-hand contact and closes the circuit of relay 33 which connects power to the motor 34 in such a manner as to drive it in the opposite direction. The motor is geared by means of a worm 35 and pinion 36 to the comon shaft of the potentiometer 13 and the phase adjuster 10—11. Therefore, when the motor is rotated, it automatically adjusts the potentiometer until the armature of the polar relay 31 again comes to its neutral position and the rotation of the motor ceases. Under this condition the amplitude of the current incoming from the line L is restored to normal and the phase adjustor 10—11 is automatically compensated for the change in phase which accompanied the change in attenuation, so that the phase is again brought back to normal.

It will be obvious that the general principles herein disclosed may be embodied in many other organizations widely different from those illustrated without departing from the spirit of the invention as defined in the following claims.

What is claimed is:

1. The method of compensating for variation in the phase shift resulting from transmission over a transmission line including a phase controlling element, which consists in observing the change in amplitude of the arriving current which accompanies such change in phase, and adjusting a phase controlling element of the line in accordance with the observed change in amplitude.

2. The method of compensating for variation in the phase shift resulting from transmission over a transmission line including a transmission element and a phase controlling element, which consists in observing the variation of amplitude of the arriving current which accompanies the change in phase, adjusting a transmission element of the line to restore the amplitude to normal, and correspondingly adjusting a phase controlling element of the line to compensate for the change in phase.

3. The method of compensating for variation in the phase shift resulting from transmission over a transmission line including a transmission element and a phase controlling element, which consists is observing the variation of amplitude of the arriving current which accompanies the change in phase, adjusting a transmission element of the line to restore the amplitude to normal, and simultaneously adjusting a phase controlling element associated with the line in accordance with a predetermined relation between change in attenuation and change in phase to compensate for the phase variation which accompanied the observed change in amplitude.

4. The method of compensating for variation in the phase shift resulting from transmission over a transmission line including a phase controlling element, which consists in observing the change in amplitude of the arriving current which accompanies such change in phase, and automatically adjusting the phase controlling element of the line by an amount corresponding to a predetermined relation between phase change and the change in attenuation for the line.

5. The method of compensating for variation in the phase shift resulting from transmission over a transmission line including an amplitude controlling element and a phase controlling element, which consists in observing the change in amplitude which accompanies such change in phase, automatically producing an adjustment of said amplitude controlling element of the line to compensate for the observed change in amplitude, and simultaneously producing an automatic adjustment of said phase controlling element of the line in accordance with a predetermined relation between the change in phase and change in amplitude of the line, thereby restoring the phase to normal.

6. A system to compensate for variation in phase shift, comprising a transmission line over which an alternating current may be transmitted, means to indicate a change in the amplitude of the arriving current which corresponds to a change in the phase thereof, and a phase varying element associated with the line and adapted to be adjusted in accordance with the indicated change in amplitude to compensate for the change in phase.

7. A system to compensate for variation in phase shift, comprising a transmission line over which an alternating current may be transmitted, means to indicate a change in the amplitude of the arriving current which corresponds to a change in the phase thereof, an amplitude controlling element associated with the line and adapted to be adjusted to restore the amplitude to normal, and a phase controlling element also associated with the line and adapted to be adjusted by an amount whose relation to the adjustment of said amplitude controlling element corresponds to a predetermined relation between change in attenuation and change in phase for the line.

8. A system to compensate for variation in phase shift, comprising a transmission line over which an alternating current may be transmitted, means to indicate a change in the amplitude of the arriving current which corresponds to a change in the phase thereof, an amplitude controlling element associated with the line and adapted to be adjusted to restore the amplitude to normal, and an adjustable phase controlling element associated with the line, said phase controlling element being so mechanically related to the amplitude controlling element as to be simultaneously adjusted therewith by an amount which is related to the adjustment of the amplitude controlling element in accordance with the predetermined relation between change in attenuation and change in phase for the line.

9. A system to compensate for variation in phase shift, comprising a transmission line over which an alternating current may be transmitted, means responsive to changes in the amplitude of the arriving current which accompanies a change in phase of said current, a phase controlling element associated with the line, and means automatically controlled by said responsive means to adjust said phase controlling element by an amount corresponding to a predetermined relation between phase change and the change in attenuation for the line.

10. A system to compensate for variation in phase shift, comprising a transmission line over which an alternating current may be transmitted, means responsive to changes in the amplitude of the arriving current which accompanies a change in phase of said current, and amplitude controlling element associated with the line, a phase controlling element associated with the line, and means controlled by said responsive means to automatically adjust said amplitude controlling means to compensate for the change in amplitude of the arriving current and to simultaneously adjust said phase controlling means by an amount corresponding to a predetermined relation between the phase change and the change in attenuation for the line.

In testimony whereof, I have signed my name to this specification this 22nd day of September, 1927.

HERMAN A. AFFEL.